United States Patent
Lee

(10) Patent No.: US 7,598,945 B2
(45) Date of Patent: Oct. 6, 2009

(54) WIRELESS COMMUNICATION TERMINAL FOR CHANGING IMAGE FILES OF BACKGROUND PICTURE AND METHOD FOR DISPLAYING IMAGE FILES OF BACKGROUND PICTURE USING THE SAME

(75) Inventor: Ju-Byung Lee, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 193 days.

(21) Appl. No.: 10/397,751

(22) Filed: Mar. 26, 2003

(65) Prior Publication Data

US 2004/0080518 A1    Apr. 29, 2004

(30) Foreign Application Priority Data

Oct. 24, 2002    (KR)    ............... 10-2002-0065290

(51) Int. Cl.
G09G 5/00    (2006.01)
G06F 3/048    (2006.01)
(52) U.S. Cl. ............... 345/169; 345/156; 715/867
(58) Field of Classification Search ............ 379/93.17; 455/550, 566, 575; 345/156–173, 1.1
See application file for complete search history.

(56) References Cited

U.S. PATENT DOCUMENTS 6,473,628 B1 * 10/2002 Kuno et al. ............. 455/566
6,782,281 B1 * 8/2004 Nagasawa ............. 455/575.3
6,851,093 B2 * 2/2005 Kawakita ................ 715/867
2002/0055992 A1 * 5/2002 King et al. ............... 709/221
2002/0094846 A1 * 7/2002 Kishimoto et al. ........ 455/566
2002/0123368 A1 * 9/2002 Yamadera et al. ......... 455/556
2004/0032434 A1 * 2/2004 Pinsky et al. ............. 345/814
2004/0203508 A1 * 10/2004 Cauwels et al. .......... 455/90.3

* cited by examiner

Primary Examiner—Duc Q Dinh
(74) Attorney, Agent, or Firm—The Farrell Law Firm, LLP

(57) ABSTRACT

Portable communication terminal and a method for displaying image files of a background picture using the same. The portable communication terminal comprises a mode setting unit for setting a background picture display mode in response to an input signal to selectively display displayable image files on a screen when a desired part mounted to a body of the terminal is operated, a storage unit for storing the image files and the display mode set by the mode setting unit, a sensor for sensing an operation signal generated when the desired part is operated, a mode discriminator for detecting and discriminating the background picture display mode stored in the storage unit if the sensor senses the operation signal, a controller for detecting at least one image file to be displayed on the screen from among the image files stored in the storage unit in response to the display mode discrimination result from the mode discriminator, and a display unit for displaying the image file detected by the controller as a background picture on the screen under control of the controller.

14 Claims, 3 Drawing Sheets

WIRELESS COMMUNICATION TERMINAL FOR CHANGING IMAGE FILES OF BACKGROUND PICTURE AND METHOD FOR DISPLAYING IMAGE FILES OF BACKGROUND PICTURE USING THE SAME

PRIORITY

This application claims priority to an application entitled "WIRELESS COMMUNICATION TERMINAL FOR CHANGING IMAGE FILES OF BACKGROUND PICTURE AND METHOD FOR DISPLAYING IMAGE FILES OF BACKGROUND PICTURE USING THE SAME", filed in the Korean Industrial Property Office on Oct. 24, 2002 and assigned Serial No. 2002-65290, the contents of which are hereby incorporated by reference herein.

BACKGROUND OF THE INVENTION

1. Field of the Invention

The present invention relates to portable communication terminals, and more particularly to a portable communication terminal which is capable of displaying an image file as a background picture on a screen in response to an external operation, and an image file display method using the same.

2. Description of the Related Art

With the rapid advance of the communication industry and the rapid growth of mobile communication services, mobile communication terminals (referred to hereinafter as wireless communication terminals) have taken a position as a necessity of life. In order to meet users' various requests for improved functions, such wireless communication terminals have a variety of functions in addition to a basic mobile wireless telephony function. Such additional functions may be, for example, a background picture setting function, a short message service (SMS) function, an MP3 function, a wireless Internet function, a camera function, a TV function, a VOD (video on demand) function, etc.

In order to utilize the background picture setting function, a user accesses a content provision server, which provides image files for a background picture, in a wired and/or wireless connection with a portable communication terminal to download a desired one of the image files from the server. Thereafter, the user stores the downloaded image file in a memory of the portable communication terminal such that it can be displayed according to a given state of the terminal. This state of the portable communication terminal may be, for example, a power-on state, power-off state or normal state.

As a result, if the cover and/or folder of the portable communication terminal is opened, then the terminal may continuously display an image file set as a background picture on a screen.

In this connection, in a conventional method for displaying image files of a background picture using the portable communication terminal, only one of the image files is continuously displayed as the background picture on the screen. For this reason, in order to display a different image file as the background picture, the user is inconvenienced by having to select and register a different image file in a background picture setting via a menu provided in the portable communication terminal.

Further, whenever desiring to change the current image file of the background picture to each image file newly downloaded from the contents provision server, it takes the user a considerable amount of time to conduct a background picture setting operation if he/she is not skilled.

Moreover, where image files are downloaded from the content provision server under a pay condition, only one thereof will generally be selected to be set as the background picture. As a result, image files purchased under the pay condition are reduced in their usage, resulting in a loss in the user's desire to further purchase image files.

SUMMARY OF THE INVENTION

Therefore, the present invention has been made in view of the above problems, and it is an object of the present invention to provide a portable communication terminal which is capable of removing a user's inconvenience of having to perform a background picture change operation through a background picture setting menu each time he/she desires to change an image file set as a background picture, and a method for displaying image files of a background picture using the same.

It is another object of the present invention to provide a portable communication terminal which is capable of setting a plurality of image files as a background picture and displaying the set image files as the background picture in a random order and at a random time interval, and a method for displaying image files of a background picture using the same.

It is yet another object of the present invention to provide a portable communication terminal which is capable of increasing the use of image files purchased from a contents provision server and, in turn, a user's desire to further purchase image files, and a method for displaying image files of a background picture using the same.

In accordance with one aspect of the present invention, the above and other objects can be accomplished by the provision of a portable communication terminal comprising mode setting means for setting a background picture display mode in response to an input signal to selectively display displayable image files on a screen when a desired part mounted to a body of the terminal is operated; storage means for storing the image files and the display mode set by the mode setting means; sensing means for sensing an operation signal generated when the desired part is operated; mode discrimination means for detecting and discriminating the background picture display mode stored in the storage means if the sensing means senses the operation signal; control means for selecting at least one image file to be displayed on the screen from among the image files stored in the storage means in response to the display mode discrimination result from the mode discrimination means; and display means for displaying the image file detected by the control means as a background picture on the screen under control of the control means.

Preferably, the background picture display mode may include a fixed display mode and a random display mode. The fixed display mode is a mode for displaying at least one of the image files stored in the storage means as the background picture on the screen. The random display mode is a mode for displaying a plurality of ones of the image files stored in the storage means as the background picture on the screen at a fixed or random time interval. In this case, the mode setting means sets the background picture display mode to one of the fixed display mode and the random display mode in response to the input signal.

Preferably, the desired part may be a cover or folder which is connected with the body in such a way that it can be opened and closed. In this case, the operation signal sensed by the sensor is generated when the cover or folder is opened from the terminal. When there are no contents to be displayed on the screen corresponding to a service in the opened state of the cover or folder, the control means controls the display means to display at least one of the image files stored in the storage means as the background picture on the screen according to the background picture display mode.

If the mode discrimination means discriminates the background picture display mode stored in the storage means as the fixed display mode, the control means selects at least one image file set from among the image files stored in the storage means and provides the selected image file to the display means. The display means displays the image file provided from the control means as the background picture on the screen.

If the mode discrimination means discriminates the background picture display mode stored in the storage means as the random display mode, the control means randomly selects a plurality of image files from among the image files stored in the storage means and provides the selected image files to the display means. The display means displays the image files provided from the control means as the background picture on the screen. In this case, the control means sets a display time interval between the plurality of selected image files and controls the display means to display each of the plurality of image files as the background picture on the screen for the display time interval.

Preferably, the mode setting means, when setting the background picture display mode to the random display mode, may set, in response to the input signal, a display order of a plurality of image files to be displayed when the cover or folder is opened. In this case, the control means controls the display means to display the plurality of selected image files as the background picture on the screen in the display order set by the mode setting means.

In accordance with another aspect of the present invention, there is provided a method for displaying image files of a background picture using a portable communication terminal, comprising the steps of a) setting a background picture display mode in response to an input signal to selectively display the image files as a background picture on a screen when a part mounted to a body of the terminal is operated; b) storing the image files and the display mode; c) sensing an operation signal generated when the part is operated; d) detecting and discriminating the set and stored background picture display mode if the operation signal is sensed; e) detecting at least one image file to be displayed on the screen from among the stored image files in response to the display mode discrimination result; and f) displaying the detected image file as the background picture on the screen in response to an input command.

Preferably, the background picture display mode may include a fixed display mode for displaying at least one of the stored image files as the background picture on the screen, and a random display mode for displaying a plurality of the stored image files as the background picture on the screen at a random time interval. In this case, the step a) includes the step of setting the background picture display mode to one of the fixed display mode and random display mode in response to the input signal.

Preferably, the part may be any one of a cover and folder mounted to the body. In this case, the operation signal sensed at the step c) is generated when the cover or folder is opened from the terminal. The step f) includes the step of, when there are no contents to be displayed on the screen corresponding to a service in the opened state of the cover or folder, displaying at least one of the stored image files as the background picture on the screen according to the background picture display mode.

Preferably, the step e) may include the step of, if the background picture display mode is discriminated as the fixed display mode at the step d), detecting at least one image file set from among the image files stored at the step b), and the step f) may further include the step of displaying the detected image file as the background picture on the screen. Alternatively, the step e) may include the step of, if the background picture display mode is discriminated as the random display mode at the step d), randomly detecting a plurality of image file from among the image files stored at the step b), and the step f) may further include the step of displaying the detected image files as the background picture on the screen.

When the random display mode is discriminated, step f) may further include the step of setting a display time interval between selected image files and displaying each of the plurality of image files as the background picture on the screen for the duration of the display time interval. Step a) may further include the step of, when setting the background picture display mode to the random display mode, setting, in response to the input signal, a display order of a plurality of image files to be displayed when the cover or folder is opened, and the step f) may further include the step of displaying the plurality of selected image files as the background picture on the screen in the set display order.

In a feature of the present invention, a background picture display mode can be selectively set to a fixed display mode or a random display mode in a simple manner according to a user's selection. Therefore, image files of a background picture can be readily changed. Moreover, when the background picture display mode is set to the random display mode, a plurality of image files are set as the background picture and then displayed as the background picture in a random order or at a random time interval, thereby increasing use of stored image files. Furthermore, image files purchased from a contents provision server providing image files are increased in use, resulting in an increase in the user's desire to further purchase image files.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted when it is not necessary to describe the subject matter of the present invention.

Figure 1:
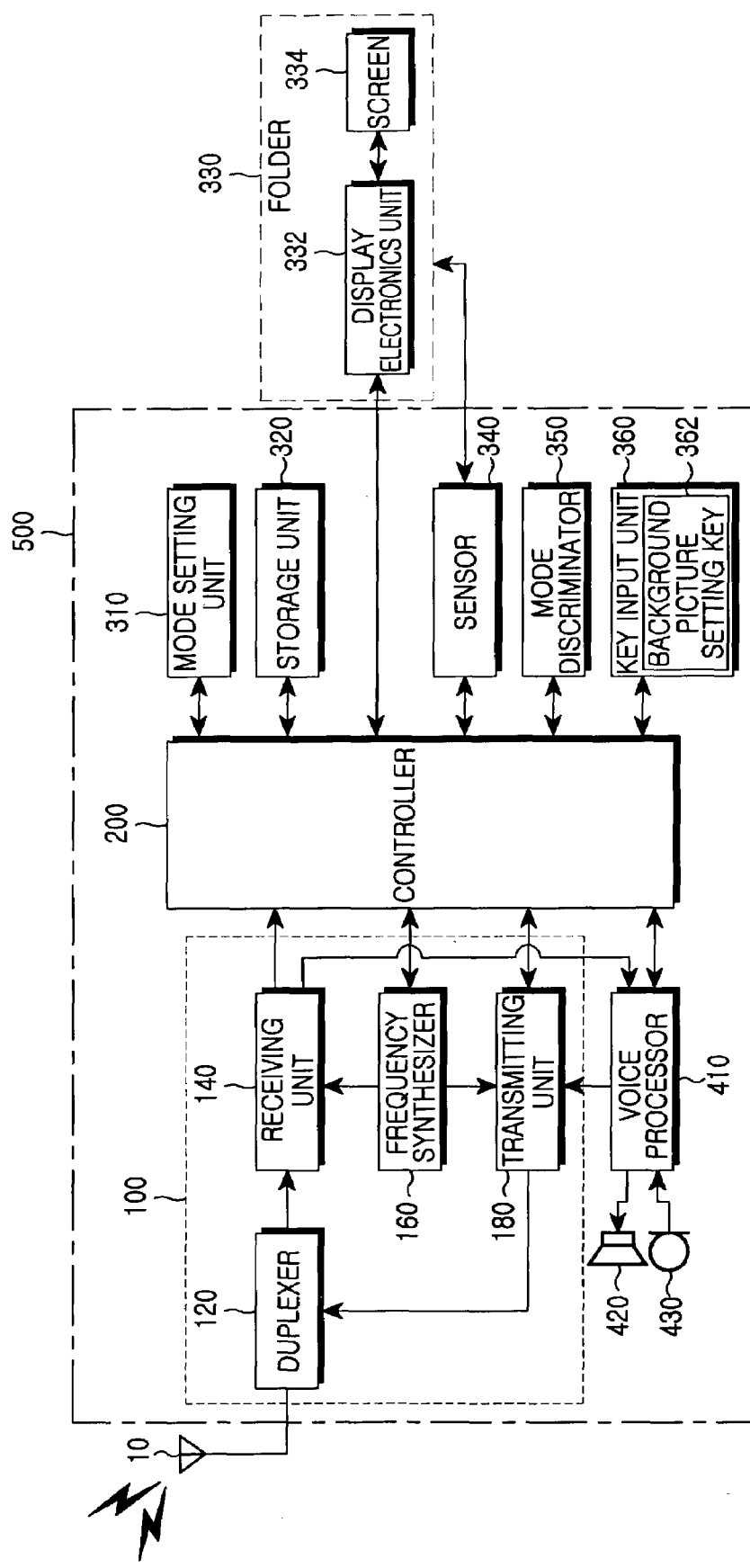
FIG. 1 is a block diagram showing a preferred embodiment of a wireless communication terminal in accordance with the present invention.

With reference to FIG. 1, there is shown in block form a preferred embodiment of a wireless communication terminal in accordance with the present invention. Before describing the present embodiment, a brief description will hereinafter be given of a general construction of the wireless communication terminal with reference to FIG. 1.

As shown in FIG. 1, the wireless communication terminal comprises a communication unit 100, a voice processor 410, a controller 200, a storage unit 320, a display unit 332, and a key input unit 360.

The communication unit 100 acts to communicate with an external communication device and receive a short message and other data transmitted from the external device. The voice processor 410 acts to decode an output signal from the communication unit 100, convert the decoded result into an electrical voice signal and output the converted voice signal to a speaker 420. The voice processor 410 also converts a voice signal received through a microphone 430 into an electrical signal, codes the converted signal and outputs the coded result to the communication unit 100.

The controller 200 functions to control the entire operation of the wireless communication terminal, including transmission and reception of signals for communication with the external device. The storage unit 320 is adapted to temporarily store a drive program necessary for the control of the controller 200 and data generated during the control thereof. The display electronics unit 332 functions to display status information and/or operation information of the wireless communication terminal on a screen 334 under the control of the controller 200. The key input unit 360 has a plurality of numeral keys and character keys, and serves to generate a signal corresponding to a selected one of the keys and transfer the generated signal to the controller 200.

Stored in the storage unit 320 according to the present embodiment are image files displayable as a background picture on the screen 334. Provided in the key input unit 360 according to the present embodiment are operation keys of the portable communication terminal, including a background picture setting key 362 for providing a service for setting of the image files stored in the storage unit 320 as the background picture in response to a selection signal.

As shown in FIG. 1, the communication unit 100 also includes a duplexer 120, a receiving unit 140, a frequency synthesizer 160 and a transmitting unit 180.

The duplexer 120 acts to extract a signal of a predetermined frequency band from among signals received at an antenna 10 and output the extracted signal to the receiving unit 140. The duplexer 120 also transfers an output signal from the transmitting unit 180 to the antenna 10. The receiving unit 140 is operated under the control of the controller 200 to transfer output data from the duplexer 120 to the voice processor 410 if it corresponds to a voice signal, and to the controller 200 if it does not correspond to a voice signal.

The frequency synthesizer 160 acts to generate and output frequencies to the transmitting unit 180 and receiving unit 140 under the control of the controller 200, respectively. The transmitting unit 180 is adapted to convert an output signal from the voice processor 410 into a signal of a predetermined frequency band for transmission in response to an output signal from the frequency synthesizer 160.

In the wireless communication terminal according to the present embodiment, the display electronics unit 332 and screen 334 are mounted to a folder 330 to be integrated therewith. The folder 330 is connected with a body 500 of the terminal in such a way that it can be opened and closed. In the present embodiment, the wireless communication terminal will be described to be of a folder type having the folder 330. However, the present invention is similarly applied to a wireless communication terminal of a flip type having a cover (not shown).

On the other hand, the wireless communication terminal according to the present embodiment further comprises a mode setting unit 310, a sensor 340 and a mode discriminator 350.

The mode setting unit 310 acts to set a background picture display mode in response to the operation of the background picture setting key 362 in the key input unit 360 to selectively display the image files stored in the storage unit 320 as the background picture(s) on the screen 334 when the folder 330 is opened from the body 500.

The background picture display mode settable by the mode setting unit 310 via the background picture setting key 362 includes a fixed display mode and a random display mode. The fixed display mode is a mode for displaying at least one of the image files stored in the storage unit 320 as the background picture on the screen 334. In order to set the background picture display mode to the fixed display mode, a user detects and sets an image file to be displayed on the screen 334 from the storage unit 320.

The random display mode is a mode for displaying a plurality of image files stored in the storage unit 320 as the background picture on the screen 334 at a random time interval. The mode setting unit 310 sets the background picture display mode to any one of the fixed display mode and random display mode in response to an input signal from the background picture setting key 362. Once selected, the storage unit 320 stores the background picture display mode set by the mode setting unit 310.

The sensor 340 acts to sense whether the folder 330 equipped with the display electronics unit 332 and screen 334 is opened from the body 500. Where the portable communication terminal is of the flip type, the sensor 340 determines whether the cover is opened. When the folder is determined to be opened, the mode discriminator 350 detects the background picture display mode previously set and stored in the storage unit 320 and sets the detected display mode. At this time, the mode discriminator 350 sets the detected display mode as either the fixed display mode or the random display mode.

In response to the display mode discrimination result, the controller 200 detects at least one image file to be displayed on the screen 334 from among the image files stored in the storage unit 320 and provides the detected image file to the display unit 332 in accordance with the display mode (i.e., fixed display mode or random display mode). The display unit 332 displays the image file provided from the controller 200 as the background picture on the screen 334 under the control of the controller 200.

Where there are items for display on the screen 334 corresponding to a service, these items take precedence over the background picture. For example, if there is an incoming call, the screen may display the words "Incoming Call" and the caller ID. On the other hand, in the case where there are no contents to be displayed on the screen 334 corresponding to a service when the folder 330 is opened, the controller 200 controls the display unit 332 to display at least one image file as the background picture on the screen 334 according to a given display mode.

If the mode discriminator 350 discriminates the background picture display mode stored in the storage unit 320 as the fixed display mode, then the controller 200 selects an image file set corresponding to the fixed display mode from among the image files in the storage unit 320 and provides the selected image file to the display electronics unit 332. The display electronics unit 332 displays the image file provided from the controller 200 as the background picture on the screen 334.

In the case where the mode discriminator 350 discriminates the background picture display mode stored in the storage unit 320 as the random display mode, the controller 200 randomly selects a plurality of image files from among the image files in the storage unit 320 and provides the selected image files to the display electronics unit 332. The display electronics unit 332 displays the plurality of image files provided from the controller 200 in succession as the background picture on the screen 334. In this case, the controller 200 sets a display time interval between the selected image files, and controls the display unit 332 to display each of the plurality of image files as the background picture on the screen 334 for the display time interval.

On the other hand, in the process of setting the background picture display mode to the random display mode, the mode setting unit 310 may set, in response to an input signal from the key input unit 360, the display order of a plurality of image files to be displayed when the folder 330 is opened. As a result, in the case where the background picture display mode is discriminated as the random display mode, the controller 200 controls the display unit 332 to display a plurality of image files selected according to the operation of the key input unit 360 as the background picture on the screen 334 in the set display order.

Therefore, the background picture display mode can be selectively set to the fixed display mode and the random display mode in a simple manner according to the user's selection, thereby making the change of the background picture easy. Further, when the background picture display mode is set to the random display mode, a plurality of image files are set as the background picture and then displayed as the background picture in a random order and at a fixed or random time interval, thereby increasing use of stored image files. Moreover, image files purchased from a contents provision server providing image files are increased in use, resulting in an increase in the user's desire to further purchase image files.

Figure 2:
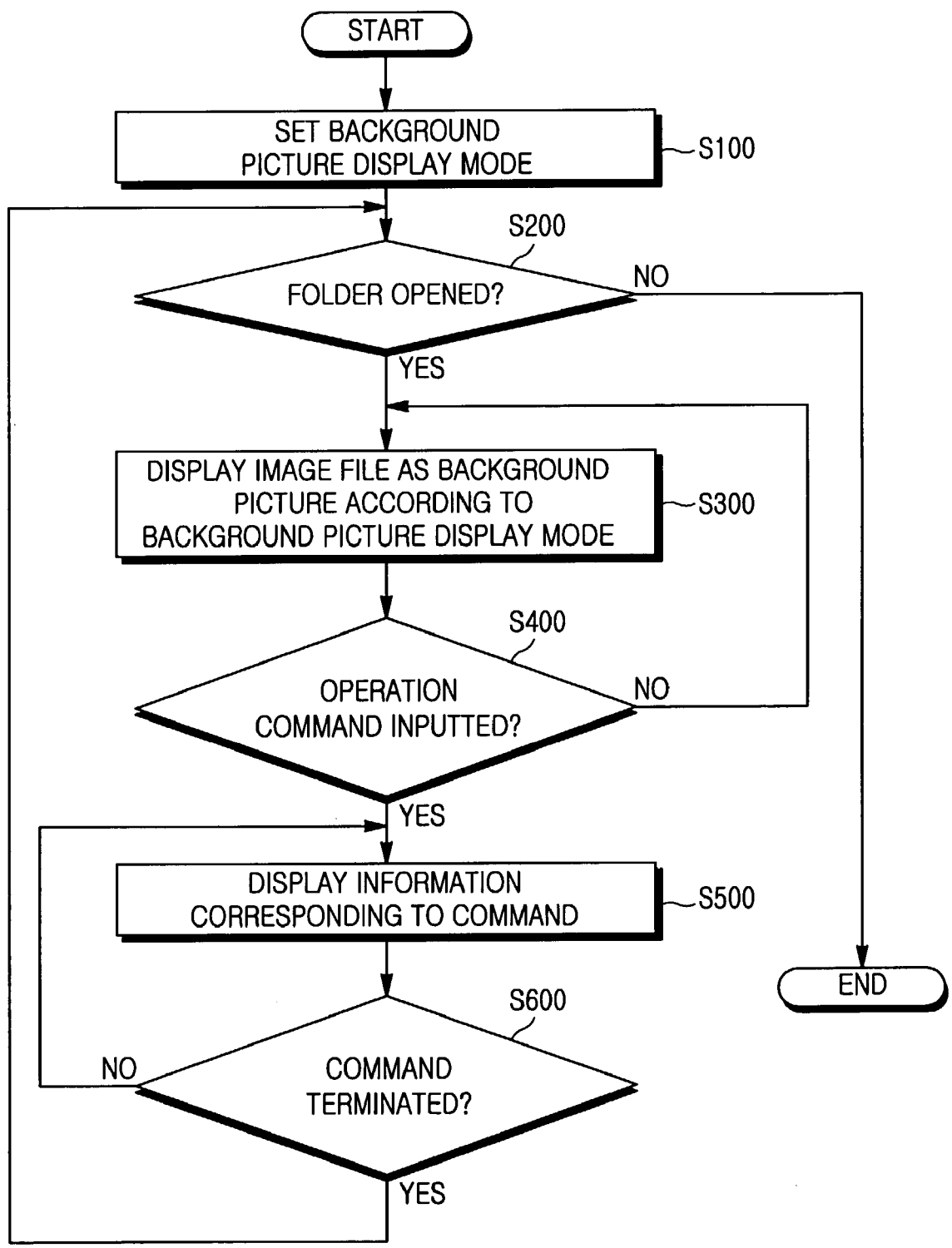
FIG. 2 is a flow chart illustrating a preferred embodiment of a method for displaying image files of a background picture using the wireless communication terminal in accordance with the present invention.

FIG. 2 is a flow chart illustrating a preferred embodiment of a method for displaying image files of a background picture using the wireless communication terminal in accordance with the present invention.

First, in response to an input signal from the background picture setting key 362 provided in the key input unit 360, the mode setting unit 310 sets a background picture display mode for image files downloaded from the content provision server and/or image files stored in the storage unit 320 (S100). As stated above, the background picture display mode includes a fixed display mode where a selected image file is fixedly displayed as the background picture on the screen 334, and a random display mode where a plurality of image files are randomly selected and displayed as the background picture on the screen 334. At this time, the set display mode is stored in the storage unit 320.

The sensor 340 senses whether the folder 330 is opened from the body 500 (S200). As stated previously, the display electronics unit 332 and screen 334 are mounted to the folder 330 to be integrated therewith, which folder is connected with the body 500 in such a way that it can be opened and closed. If the sensor 340 senses that the folder 330 is opened, then the controller 200 controls the display electronics unit 332 to display at least one of the image files stored in the storage unit 320 as the background picture on the screen 334 on the basis of the background picture display mode previously set and stored in the storage unit 320 (S300).

While displaying the image file as the background picture on the screen 334 in the background picture display mode, the controller 200 determines whether an operation command has been inputted from any one of the operation keys in the key input unit 360 (S400). Upon determining that an operation command from the key input unit 360 has been inputted, the controller 200 controls the display unit 332 to display information corresponding to the inputted operation command on the screen 334 (S500). Thus, display information for an input operation command takes precedence over the display of a background image. If the command has terminated (S600), the processing returns to step S200.

Therefore, a utilization degree of image files to be set as the background picture can be increased by selectively setting the background picture display mode to the fixed display mode and the random display mode.

Figure 3:
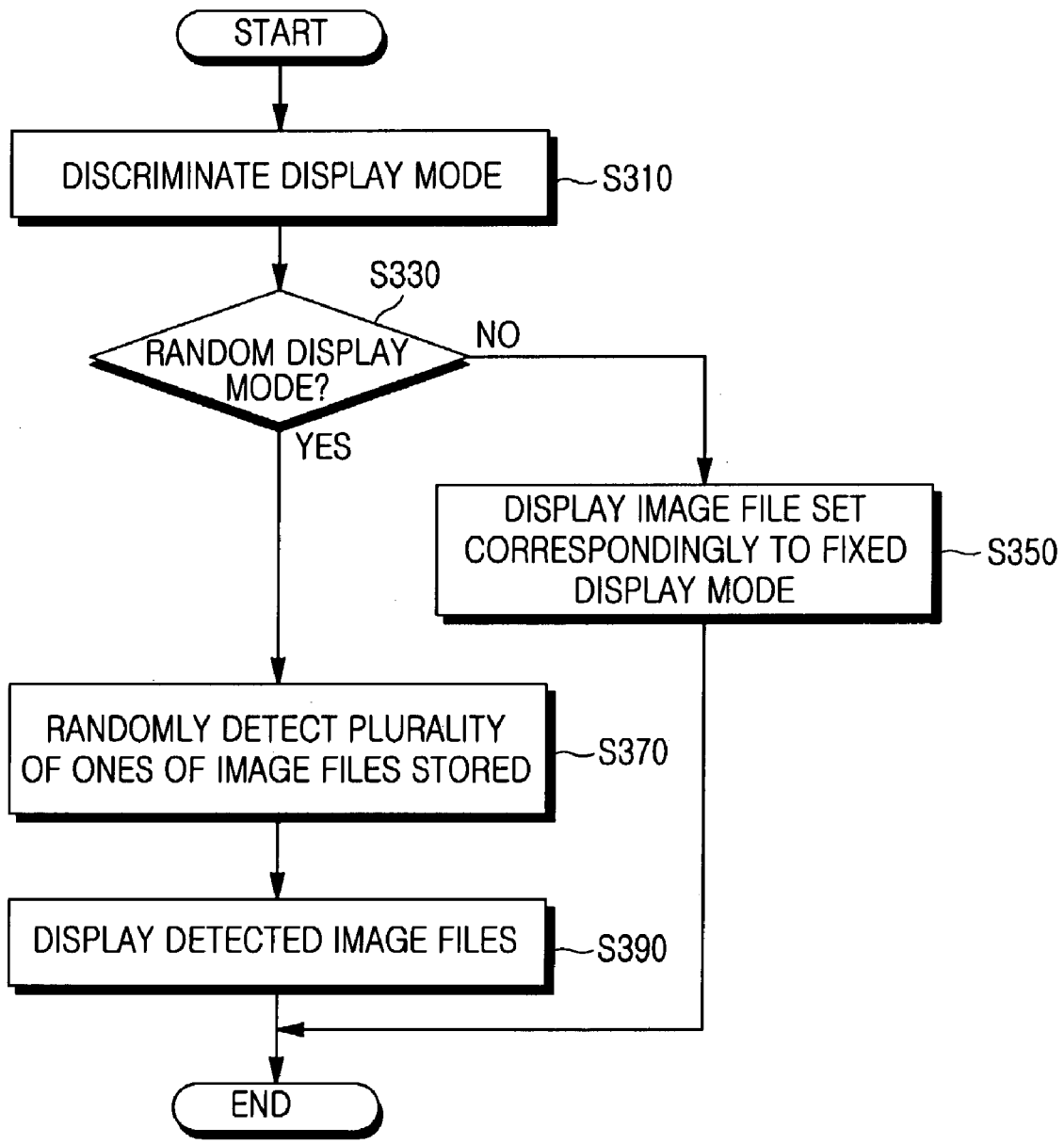
FIG. 3 is a flow chart illustrating in detail the step in FIG. 2 of displaying the image files of the background picture.

FIG. 3 is a flow chart illustrating in detail step S300 in FIG. 2. First, the mode discriminator 350 detects the background picture display mode previously set and stored in the storage unit 320 and sets the detected display mode as the selected fixed display mode or selected random display mode (S310). At this time, if the discriminator 350 sets the display mode stored in the storage unit 320 as the fixed display mode, not the random display mode (S330), then the controller 200 detects at least one image file set correspondingly to the fixed display mode from the storage unit 320 and controls the display unit 332 to display the detected image file as the background picture on the screen 334 (S350).

On the other hand, if the display mode stored in the storage unit 320 is set as the random display mode at the above step S330, then the controller 200 randomly detects a plurality of image files from among the image files stored in the storage unit 320 and provides the detected image files to the display electronics unit 332 (S370). As a result, the display electronics unit 332 displays the image files provided from the controller 200 as the background picture on the screen 334 at a given display time interval in the provision order (S390).

Accordingly, when the background picture display mode is set to the random display mode, a plurality of image files are set as the background picture and then displayed as the background picture in a random order and at a fixed or random time interval, thereby increasing the use of stored image files.

Although the present embodiment has been described to select and set a plurality of image files as the background picture and display a fixed one of the set image files as the background picture on the screen 334 whenever the folder 330 is opened, different image files may be displayed as the background picture whenever the folder 330 is opened.

As apparent from the above description, according to the present invention, a background picture display mode can be selectively set to a fixed display mode and a random display mode in a simple manner according to a user's selection. Therefore, image files of a background picture can be readily changed.

Further, when the background picture display mode is set to the random display mode, a plurality of image files are set as the background picture and then displayed as the background picture in a random order or at a random time interval, thereby increasing the use of stored image files.

Furthermore, image files purchased from a contents provision server providing image files are increased in use, resulting in an increase in the user's desire to further purchase image files.

It is noted that one skilled in the art will recognize that various units and blocks shown in FIG. 1 may be consolidated together, including within controller 200. For example, the mode setting unit 310 and mode discriminator 350 may be consolidated in one unit, and may also be consolidated within controller 200. Other equivalent configurations may be used for implementation, as readily recognized by one skilled in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A portable communication terminal comprising:
a mode setting unit for setting a background picture display mode of an idle screen, wherein said background picture display mode includes a fixed display mode for displaying at least one of a plurality of image files as a background picture on the idle screen and a random display mode for randomly selecting and displaying one of the plurality of image files whenever one or more predetermined conditions for the random display mode are satisfied, wherein the mode setting unit sets the background picture display mode to one of the fixed display mode and the random display mode in response to an input signal;
a storage unit for storing the background picture display mode set by said mode setting unit, the plurality of image files, and the predetermined conditions, wherein one of the predetermined conditions include displaying one of the plurality of image files selected according to the random display mode on the screen after operation of a component of the portable communication terminal, the component being one of a cover and a folder mounted to a body of the portable communication terminal;
a sensor for sensing whether the component is opened;
a control unit for determining whether the random display mode is set when the sensor senses that the component is opened, and selecting randomly one of the plurality of image files when the random display mode is set; and
a display unit for displaying the image file selected by said control unit as the background picture of the idle screen under control of said control unit.

2. The portable communication terminal as set forth in claim 1, wherein said control unit in an opened state of said cover controls said display unit to display at least one of said image files stored in said storage means as said background picture on said screen according to said background picture display mode when there are no items for display on the screen corresponding to a service.

3. The portable communication terminal as set forth in claim 2, wherein said control unit selects at least one image file set corresponding to said fixed display mode from among said image files stored in said storage unit and controls said display unit to display the selected image file as said background picture on said screen, when a mode discriminator sets said background picture display mode stored in said storage unit as said fixed display mode.

4. The portable communication terminal as set forth in claim 2, wherein said control unit controls said display unit to successively select and display each of the displayable image files as said background picture on said screen whenever the predetermined conditions for the random display mode are satisfied, when a mode discriminator sets said background picture display mode stored in said storage unit as said random display mode.

5. The portable communication terminal as set forth in claim 4, wherein a second predetermined condition for the random display mode is a display time interval between the displayable image files.

6. The portable communication terminal as set forth in claim 1, wherein said mode setting unit sets, in response to said input signal, a display order of a plurality of image files, when said background picture display mode is set to said random display mode; and
wherein said control unit controls said display unit to select and display one of said plurality of image files as said background picture on said screen in said display order set by said mode setting unit and display whenever the one or more predetermined conditions for the random display mode are satisfied.

7. The portable communication terminal as set forth in claim 1, wherein the control unit randomly selects one of the plurality of displayable image files, in an opened state of the component when the random display mode is set and the predetermined condition for the random display mode is to display one of the displayable image files selected according to the random display mode on the screen and the predetermined conditions for the random display mode includes at least one of the return of the current screen to any of a plurality of stored image files as the background picture on the screen and a display time interval between the displayable image files.

8. A method for displaying at least one of a plurality of image files of a background picture using a portable communication terminal, comprising the steps of:
a) setting a background picture display mode of an idle screen at a mode setting unit to one of a fixed display mode and a random display mode in response to an input signal wherein the fixed display mode displays at least one of the plurality of image files as the background picture on the idle screen and a random display mode randomly selects and displays one of the plurality of image files whenever one or more predetermined conditions for the random display mode are satisfied;
b) storing the background picture display mode set by the mode setting unit the plurality of image files, and the predetermined conditions, wherein one of the predetermined conditions include displaying one of the plurality of image files selected according to the random display mode on the screen after operation of a component of the portable communication terminal the component being one of a cover and a folder mounted to a body of the portable communication terminal;
c) sensing whether the component is opened;
d) determining whether the random display mode is set when the sensor senses that the component is opened;
e) selecting randomly one of the plurality of image files when the random display mode is set; and
f) displaying the image file selected as the background picture on the idle screen according to the random display mode.

9. The method as set forth in claim 8, wherein said step f) includes the step of displaying at least one of said stored image files as said background picture on said screen according to said background picture display mode when there are no items for display on the screen corresponding to a service.

10. The method as set forth in claim 9, wherein said step e) includes detecting at least one image file set as said fixed display mode from among said image files stored at said step b) when said background picture display mode is said fixed display mode at said step; and
wherein said step f) further includes displaying the detected image file as said background picture on said screen.

11. The method as set forth in claim 9, wherein said step e) includes randomly detecting the displayable image files from among said image files stored at said step b) when said background picture display mode is said random display mode at said step; and wherein said step f) further includes successively selecting and displaying each of the displayable image files as said background picture on said screen whenever the one or more predetermined conditions for the random display mode are satisfied.

12. The method as set forth in claim 11, wherein the predetermined condition for the random display mode is a predetermined display time interval between the displayable image files.

13. The method as set forth in claim 12, wherein said step a) further includes setting, in response to said input signal, a display order of a plurality of image files, when setting said background picture display mode to said random display mode; and wherein said step f) further includes the step of selecting and displaying one of said plurality of image files as said background picture on said screen in said set display order and display whenever one or more predetermined conditions for the random display mode are satisfied.

14. The method as set forth in claim 8, further comprising:

selecting randomly one of a plurality of displayable image files, in an opened state of the component when the random display mode is set and the predetermined condition for the random display mode is to display one of the displayable image files selected according to the random display mode on the screen and displaying said selected image file as said background picture on said screen according to said display mode;

wherein the predetermined conditions for the random display mode includes at least one of the return of the current screen to any of a plurality of stored image files as the background picture on the screen and a display time interval between the displayable image file.

\* \* \* \* \*

UNITED STATES PATENT AND TRADEMARK OFFICE
CERTIFICATE OF CORRECTION

PATENT NO.        : 7,598,945 B2
APPLICATION NO. : 10/397751
DATED             : October 6, 2009
INVENTOR(S)       : Ju-Byung Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 287 days.

Signed and Sealed this

Twenty-eighth Day of September, 2010

David J. Kappos
*Director of the United States Patent and Trademark Office*